(12) United States Patent
Hall-Smith et al.

(10) Patent No.: US 11,758,037 B2
(45) Date of Patent: Sep. 12, 2023

(54) DECT PORTABLE DEVICE BASE STATION

(71) Applicant: Meizhou Guo Wei Electronics Co. Ltd, Guangdong (CN)

(72) Inventors: Richard Hall-Smith, London (GB); Hongbing Liu, Shenzhen (CN)

(73) Assignee: MEIZHOU GUOWEI ELECTRONICS CO., LTD, Meizhou (CN)

( * ) Notice: Subject to any disclaimer, the term of this patent is extended or adjusted under 35 U.S.C. 154(b) by 232 days.

(21) Appl. No.: 17/426,437

(22) PCT Filed: Feb. 5, 2020

(86) PCT No.: PCT/IB2020/050908
§ 371 (c)(1),
(2) Date: Jul. 28, 2021

(87) PCT Pub. No.: WO2020/161631
PCT Pub. Date: Aug. 13, 2020

(65) Prior Publication Data
US 2022/0131970 A1 Apr. 28, 2022

(30) Foreign Application Priority Data
Feb. 5, 2019 (GB) ..................................... 1901602

(51) Int. Cl.
*H04M 1/72502* (2021.01)
(52) U.S. Cl.
CPC .... *H04M 1/72502* (2013.01); *H04M 2250/08* (2013.01)
(58) Field of Classification Search
CPC ...................... H04M 1/72502; H04M 2250/08
See application file for complete search history.

(56) References Cited

U.S. PATENT DOCUMENTS

| 2011/0286443 A1* | 11/2011 | Wu | ............ H04W 8/06 370/310 |
| 2018/0137856 A1* | 5/2018 | Gilbert | ................ G06F 3/167 |
| 2018/0220003 A1* | 8/2018 | Estrakh | ............. H04M 3/527 |

OTHER PUBLICATIONS

The International Search Report and the Written Opinion of the International Searching Authority, or the Declaration, PCT/IB2020/050908, Meizhou Guo Wei Electronics Co., Ltd, 5, dated Feb. 2020, completion of the international search dated Apr. 17, 2020.

(Continued)

*Primary Examiner* — Yuwen Pan
*Assistant Examiner* — Angelica Perez
(74) *Attorney, Agent, or Firm* — FLENER IP & BUSINESS LAW; Zareefa B. Flener

(57) ABSTRACT

The present invention concerns a base station (12) having a DECT communication module (13) for wirelessly communicating with one or more registered portable DECT devices 10). The base station also has a virtual assistant module connecting over an IP communication channel (28) to a virtual assistant providing responses to user instructions, and a telephony module connecting to and accessing a remote resource over a telephony communication channel (27). A device manager (15) identifies and stores communication parameters of the DECT devices, and can implement a user instruction communicated from a DECT device via the DECT communication module and can route virtual assistant responses to a user instruction. A broker module (19) establishes a communication link between the DECT devices and the virtual assistant, and between the DECT devices and the telephony communication channel. The broker module includes a transcoder module (17) operating to trans-code communications over the communication link between the DECT devices and the virtual assistant in the event of a disparity in communication parameters to enable (Continued)

communication of user instructions and responses between the virtual assistant and a DECT device.

9 Claims, 1 Drawing Sheet

(56) References Cited

OTHER PUBLICATIONS

Written Opinion of the International Preliminary Examing Authority, International application No. PCT/IB2020/050908, International filing date May 2, 2020, Meizhou Guo Wei Electronics Ltd., (dated Jan. 2015).
Written Opinion of the International Searching Authority, International application No. PCT/IB2020/050908, International filing date May 2, 2020, Meizhou Guo Wei Electronics Co., Ltd, EPO—dated Apr. 2005.
Notification of Transmittal of the International Preliminary Report on Patentability, International application No. PCT/IB2020/050908, International filing date May 2, 2020, Meizhou Guo Wei Electronics Co., Ltd., date of completion of this report Apr. 26, 2021.

* cited by examiner

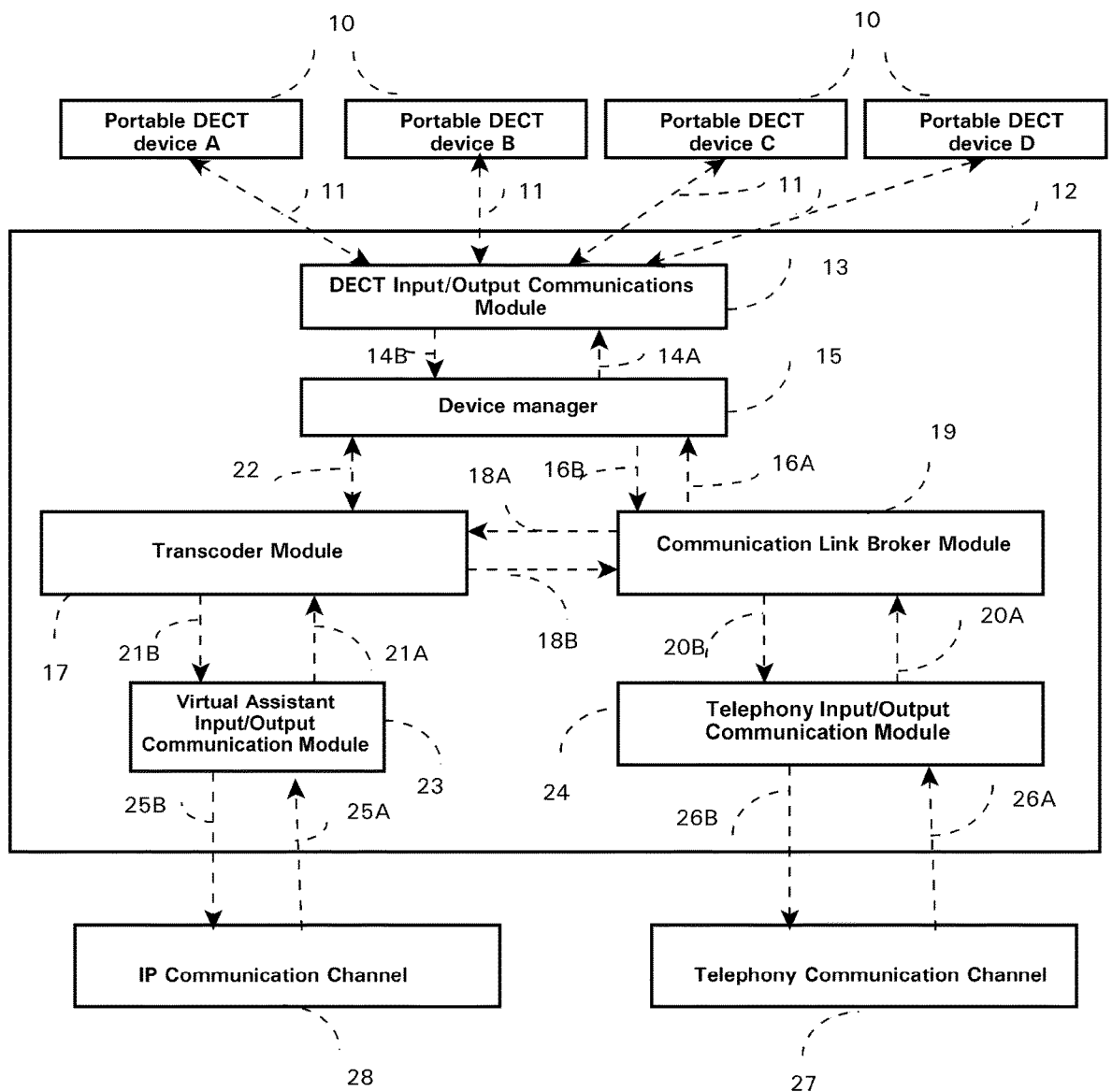

DECT PORTABLE DEVICE BASE STATION

The present invention concerns a base station for wirelessly communicating with one or more registered portable DECT devices and a method of operating the same.

In recent years, there has been a demand for systems to provide unwired interconnection of devices. For example, the ability to connect a speaker device to a music source device. Typically, this has involved a Bluetooth or Wireless connection between the two devices, with the speaker device acting as a slave to output from the master music source device.

With advances in the internet and cloud computing, there has also been a demand for systems which have devices that can be easily used, provide remote access/control, and have semi-intelligence. This has led to so-called virtual assistants which are capable of voice interaction and are accessed via the internet through a hub. These hubs are relatively simple devices comprising a microphone array, a processing unit, and a speaker, with the bulk of the processing occurring in the cloud. A user issues verbal commands to the hub which are conveyed over the internet to the virtual assistant which interprets the commands and provides a response to the hub back over the internet. For example, the user can issue a verbal command requesting an alarm in 30 minutes. This verbal command is conveyed to the virtual assistant, which will respond by providing an alarm through the hub's speaker after 30 minutes.

While such systems provide the user with many useful resources, there are limitations. For example the hub is not generally a portable device as it requires a power supply and a WiFi connection. Furthermore, even if a hub were provided with its own power source, it is limited by the WiFi range of the associated wireless router. Moreover, whilst in some instances a hub can be connected to a remote speaker via bluetooth to improve the portability, bluetooth and other wireless protocols such as Zigbee and Z-wave have a limited range and are subject to interference, due to their use of the congested 2.4 GHz spectrum.

A further issue arises in situations where a user wishes to provide virtual assistant functionality in a number of locations, such as in different rooms of their house. Whilst a user may connect multiple bluetooth speakers to a single hub, for instance to stream music in different rooms, the devices are not capable of being independent. For example, all such bluetooth speakers must have the same audio communication protocols. Multiple hubs could alternatively be provided in different rooms to allow for independent operation. However, in this scenario, co-ordination between different hubs is either non-existent or significantly reduced and, in any event, requiring separate hub hardware in each room leads to significant additional expense.

Finally, such hubs have limitations in their capability to retrieve resources from a wide range of sources or to use communication channels which are not internet based.

The present invention therefore seeks to address the above problems with the prior art.

According to a first aspect of the present invention, there is provided a base station for wirelessly communicating with one or more registered portable DECT devices, the base station comprising:—a virtual assistant module for connecting over an IP communication channel to a virtual assistant providing responses to user instructions; a telephony module for connecting to and accessing a remote resource over a telephony communication channel; a DECT communication module for wirelessly communicating with the one or more devices; a device manager for identifying the or each registered portable DECT device and for storing communication parameters of that respective device, the device manager capable of implementing a user instruction communicated from a portable DECT device via the DECT communication module and capable of routing virtual assistant responses to a user instruction; and a broker module for establishing a communication link between the one or more DECT devices and the virtual assistant, and between the one or more portable DECT devices and the telephony communication channel, the broker including a transcoder module operating to trans-code communications over the communication link between the one or more portable DECT devices and the virtual assistant in the event of a disparity in communication parameters to enable communication of user instructions and responses between the virtual assistant and a portable DECT device.

In this way, a base station is provided that acts as a central hub for accessing a virtual assistant through one or more portable DECT devices. Consequently, virtual assistant services may be accessed over a much greater range relative to the hub and improved portability is achieved. In addition, the services can be accessed regardless of their communication parameters. At the same time, the system processing is centralised within the base station, allowing inexpensive portable DECT devices to be used with the system. This provides cost savings whilst providing multi-room functionality. For example, the system allows low cost DECT phone handsets to be used in addition to more expensive high fidelity audio devices. Furthermore, the base station allows DECT devices to access both the virtual assistant and a telephony communication channel, providing a greater range of services over a enlarged geographic area.

In embodiments, the transcoder module operates to trans-code communications over the communication link between the one or more portable DECT devices and the telephony communication channel in the event of a disparity in communication parameters to enable implementation of user instructions over the telephony communication channel and retrieval of remote resources. In this way, communications between different DECT devices and the telephony communication channel are facilitated.

In embodiments, the broker receives and acts on virtual assistant responses to establish a communication link between the one or more portable DECT devices and the telephony communication channel. In this way, in response to a request by a user, the virtual assistant may establish a telephone call on the telephony communication channel. This may, for instance, allow a user to establish a landline call based on a recipients name, without knowing their telephone number.

In embodiments, the broker receives and acts on virtual assistant responses to establish a communication link between one or more DECT devices and the virtual assistant. In this way, the virtual assistant response may include transmitting a communication to one or more of the DECT devices. For example, in response to a use request, the virtual assistant may stream music to a device.

In embodiments, the virtual assistant response comprises an alert associated with an alarm or timer. In this way, the virtual assistant may sound an alarm or timer alert through one or more of the DECT devices.

In embodiments, virtual assistant responses are associated with a particular DECT device(s). In this way, the virtual assistant response may be directed to a specific device or a number of specific of devices, for example so that different devices receive different notifications.

In embodiments, the device manager logs received user instructions as being associated with a particular DECT device. In this way, the device manager records the activity of the local DECT devices to associate virtual assistant responses to specific received user instructions.

In embodiments, the telephony communication channel is a landline. In this way, the base station may function as a landline phone hub, to which one or more DECT handsets are connected.

In embodiments, the base station comprises a Wifi module for communication with an internet access point for connection to the IP communication channel. In this way, the base station may be physically separated from the WiFi router through which the internet is accessed.

In embodiments, the transcoder module comprises means for trans-coding between G.711 audio associated with one or more of the portable DECT devices and Orpus codec audio data associated with the virtual assistant. In this way, the base station may facilitate voice transmissions between lower cost DECT handsets and high quality audio commonly associated with voice audio assistants.

According to a second aspect of the present invention, there is provided a method of operating a base station constructed according to any preceding claim, comprising the steps of:—connecting to the virtual assistant over an IP communication channel for providing responses to user instructions; connecting to and accessing the remote resource over the telephony communication channel; wirelessly communicating with the one or more registered portable DECT devices; identifying the or each registered portable DECT device and storing communication parameters of each respective device in the device manager, the device manager for implementing a user instruction communicated from a portable DECT device and routing virtual assistant responses to a user instruction; and establishing a communication link between the one or more portable DECT devices and the virtual assistant, and between the one or more portable DECT devices and the telephony communication channel; trans-coding communications over the communication link between the one or more portable DECT devices and the virtual assistant in the event of a disparity in communication parameters to enable communication of user instructions and responses between the virtual assistant and a portable DECT device.

The single FIGURE of the drawings illustrates an example of the present invention.

One or more portable DECT devices 10 are wirelessly connected to a base station 12. In this respect, each of these respective devices (A-D) can communicate over one or more DECT channels 11 with the base station in the usual manner. While four devices are shown, it will be apparent that one or more DECT devices can be connected subject to the limitations on connectivity of the base station 12. The base station is also connected to an IP communication channel 28 and a telephony communication channel 27. In this respect, the communication channels 27 and 28 can take the form of a single telephone landline, with the channel 28 being associated with an internet access point to allow connection over the internet to a virtual assistant, for example the well known Amazon product Alexa®. For example, in this embodiment, the base station 12 comprises an Ethernet communications module for connection to a router for facilitating internet access.

The base station 12 comprises a DECT input/output communication module 13 that facilitates incoming and outgoing communications between the base station 12 and the respective one or more DECT devices 10. It will be apparent that the communication parameters of the communication channel between the base station 12 and devices 10 can vary according to the device that is connected. For example, some DECT devices may only support basic G.711 audio standards, whereas other DECT devices may allow transmission of higher quality audio through wideband or higher bit-rate data transmissions.

The DECT input/output communication module 13 is connected to a device manager 15 via input and output channels 14A and 14B. The device manager 15 can register and identify the or each registered DECT device that is connected to the base station 12. In addition, the device manager 15 stores the communication parameters of that respective device.

A communication link broker module 19 is connected to the device manager 15 by virtue of input and output channels 16A and 16B. The broker module 19 is also connected by input and output channels 18A and 18B to a transcoder module 17 which has input and output channels 21A and 21B to a virtual assistant input/output communication module 23. The virtual assistant input/output communication module 23 has connection channels 25A and 25B to the IP communication channel 28. The communication link broker module 19 is also connected to a telephony input/output communication module 24 by virtue of input and output channels 20A and 20B. The telephony input/output communication module 24 has connection channels 26A and 26B to the telephony communication channel 27.

In use, each DECT device 10 to be connected to the base station 12 is registered so that the device manager 15 will be able to identify the DECT device and will also know the communication parameters of that device. When a user issues an instruction (from the source device 10), typically a voice command, the user instruction is communicated from the DECT device, through the DECT communications module 13 to the device manager 15. The device manager will forward the user instruction to the link broker module.

There are different types of user instructions and the broker module will identify the type of user instruction. For one type of user instruction, destined for the virtual assistant, the broker module 19 will forward the instruction via the transcoder module 17 to the virtual assistant communication module 23. As the instruction will have a communication parameter appropriate for forwarding to the virtual assistant, the transcoder module will not perform any action. It is apparent that in an alternative embodiment, the transcoder module function can be omitted for this purpose or bypassed when user instructions for the virtual assistant are being sent. The virtual communication module will then transmit the user instruction over the IP communication channel to the virtual assistant.

When a response from the virtual assistant is received at the virtual assistant communication module 23, the response is forwarded to the transcoder module 17. The transcoder module 17 consults device manager 15 over a connection 22 to ascertain the destination DECT device for the response and to determine whether trans-coding of the response is required in the event of a disparity in the communication parameters between the response and the destination DECT device. If there is a disparity, the response is trans-coded into a format which can be used by the destination device. The trans-coded response is then forwarded via the communication link broker module, device manager and DECT communication module to the destination DECT device. It will be appreciated that the source device for the user instruction does not need to be the same as the destination device for the response.

Consequently, the communication link broker module can establish a communication link between the one or more DECT devices and the virtual assistant in the event of a disparity in communication parameters to enable communication of user instructions and responses between the virtual assistant and a portable DECT device. As a result, the type of DECT device that can be connected to the base station can be very flexible and can have differing communication parameters.

For another type of user instruction, destined to make a telephone call using the telephony communication channel 27, the device manager will forward the user instruction to the broker module 19. Assuming the telephone number is known, the broker module will forward the number to the telephony communication module to make the connection with the telephony communication channel and make the telephone call.

The situation may also arise where the telephone number is not know or has not been input via the DECT device, for example if a user requests the virtual assistant to initiate a call based on a voice command, such as "call mum". In such a situation, the user instruction is routed to the virtual assistant communication module. When the response, including the telephone number, is received from the virtual assistant, the transcoder module consults device manager 15 over connection 29 to ascertain the DECT device associated with the request for the telephone number. The telephone number is then forwarded to the broker module which initiates the telephone call as discussed above.

The broker module further comprise a telephone number formatting function for formatting telephone numbers received from the virtual assistant into a format suitable for initiating a call on the telephony communication channel 27. For instance, telephone numbers comprising "+" symbols or the international dial code associated with the local country, which can be processed by mobile networks, may not be processed when initiating a landline call. As such, for example, the broker module may format a telephone number to replace "0044" with "0".

It will be understood that the embodiment illustrated above shows applications of the invention only for the purposes of illustration. In practice the invention may be applied to many different configurations, the detailed embodiments being straightforward for those skilled in the art to implement.

The invention claimed is:

1. A base station (12) for wirelessly communicating with one or more registered portable Digital Enhanced Cordless Telecommunications (DECT) devices (10), the base station (12) comprising:
   a virtual assistant module (23) for connecting over an IP communication channel (28) to a virtual assistant providing responses to user instructions;
   a telephony module (24) for connecting to and accessing a remote resource over a telephony communication channel (27);
   a DECT communication module (13) for wirelessly communicating with the one or more devices (10);
   a device manager (15) for identifying the or each registered portable DECT device and for storing communication parameters of that respective device, the device manager (15) capable of implementing a user instruction communicated from a portable DECT device (10) via the DECT communication module (13) and capable of routing responses of the virtual assistant to a user instruction; and
   a broker module (19) for establishing a communication link between the one or more DECT devices (10) and the virtual assistant, and between the one or more portable DECT devices (10) and the telephony communication channel (27), the broker module (19) including a transcoder module (17) operating to trans-code communications over the communication link between the one or more portable DECT devices (10) and the virtual assistant in the event of a disparity in communication parameters to enable communication of user instructions and responses between the virtual assistant and a portable DECT device;
   wherein the broker module (19) receives and acts on responses of the virtual assistant to establish a communication link between the one or more portable DECT devices (10) and the telephony communication channel (27) and/or the broker module (19) receives and acts on virtual assistant responses to establish a communication link between one or more DECT devices (10) and the virtual assistant.

2. A base station (12) as claimed in claim 1 wherein the transcoder module (17) operates to trans-code communications over the communication link between the one or more portable DECT devices (10) and the telephony communication channel (27) in the event of a disparity in communication parameters to enable implementation of user instructions over the telephony communication channel (27) and retrieval of remote resources.

3. A base station (12) as claimed in claim 1 wherein the response of the virtual assistant comprises an alert associated with an alarm or timer.

4. A base station (12) as claimed in claim 1 wherein responses of the virtual assistant are associated with a particular DECT device(s).

5. A base station (12) as claimed in claim 1 wherein the device manager (15) logs received user instructions as being associated with a particular DECT device.

6. A base station (12) as claimed in claim 1 wherein the telephony communication channel (27) is a landline.

7. A base station (12) as claimed in claim 1 wherein the base station (12) comprises a Wifi module for communication with an internet access point for connection to the IP communication channel (28).

8. A base station (12) as claimed in claim 1 wherein the transcoder module (17) comprises means for trans-coding between G.711 audio associated with one or more of the portable DECT devices (10) and Orpus codec audio data associated with the virtual assistant.

9. A method of operating a base station (12) constructed according to claim 1, the method comprising the steps of:—
   connecting to the virtual assistant over an IP communication channel (28) for providing responses to user instructions;
   connecting to and accessing the remote resource over the telephony communication channel (27);
   wirelessly communicating with the one or more registered portable DECT devices (10);
   identifying the or each registered portable DECT device (10) and storing communication parameters of each respective portable DECT device (10) in the device manager (15), the device manager (15) for implementing a user instruction communicated from a portable DECT device (10) and routing responses of the virtual assistant to a user instruction; and
   establishing a communication link between the one or more portable DECT devices (10) and the virtual assistant, and between the one or more portable DECT devices (10) and the telephony communication channel (27);

trans-coding communications over the communication link between the one or more portable DECT devices (10) and the virtual assistant in the event of a disparity in communication parameters to enable communication of user instructions and responses between the virtual assistant and a portable DECT device;

establishing, by the broker module (19) receiving and acting on responses of the virtual assistant, a communication link between the one or more portable DECT devices (10) and the telephony communication channel (27) and/or establishing, by the broker module (19) receiving and acting on virtual assistant responses, a communication link between one or more DECT devices (10) and the virtual assistant.

\* \* \* \* \*